(12) United States Patent
Shah et al.

(10) Patent No.: US 7,636,776 B2
(45) Date of Patent: Dec. 22, 2009

(54) SYSTEMS AND METHODS FOR SYNCHRONIZING WITH MULTIPLE DATA STORES

(75) Inventors: Ashish B. Shah, Sammamish, WA (US); Lev Novik, Bellevue, WA (US); Irena Hudis, Bellevue, WA (US); Darshatkumar A. Shah, Bellevue, WA (US); Yunxin Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 10/631,264

(22) Filed: Jul. 31, 2003

(65) Prior Publication Data

US 2005/0027755 A1 Feb. 3, 2005

(51) Int. Cl.
*G06F 15/16* (2006.01)
(52) U.S. Cl. .................... 709/223; 707/1; 709/219; 709/221; 709/224; 709/220
(58) Field of Classification Search ................. 709/220, 709/227, 228
See application file for complete search history.

(56) References Cited

U.S. PATENT DOCUMENTS

| | | | | |
|---|---|---|---|---|
| 5,845,293 A * | 12/1998 | Veghte et al. | ............... | 707/202 |
| 5,991,771 A * | 11/1999 | Falls et al. | ................... | 707/202 |
| 6,324,544 B1 * | 11/2001 | Alam et al. | ................. | 707/201 |
| 6,477,543 B1 * | 11/2002 | Huang et al. | ................. | 707/200 |
| 6,505,215 B1 * | 1/2003 | Kruglikov et al. | ........... | 707/201 |
| 6,671,757 B1 * | 12/2003 | Multer et al. | ................ | 710/100 |
| 6,745,209 B2 * | 6/2004 | Holenstein et al. | .......... | 707/203 |
| 7,028,153 B1 * | 4/2006 | Noble et al. | ................. | 711/162 |
| 7,222,172 B2 * | 5/2007 | Arakawa et al. | ............ | 709/224 |
| 7,506,040 B1 * | 3/2009 | Rabe et al. | ................... | 709/223 |

* cited by examiner

*Primary Examiner*—Vivek Srivastava
*Assistant Examiner*—Jeffrey R Swearingen
(74) *Attorney, Agent, or Firm*—Workman Nydegger (57) ABSTRACT

Systems and methods for synchronizing data stores. A framework including a sync runtime enables consistent and manageable synchronization between a data store and multiple, diverse back end data stores. The sync runtime provides services such as change enumeration, conflict detection, metadata management, item ID matching, sync interruptability, and the like that are accessible to configurable adapters over an application programming interface. Each synchronizing data store can uses a sync controller to initialize an adapter that can access the services provided by the sync runtime. The sync controller can use a profile to configure each adapter. The profile can identify conflict resolution policies, synchronization filters, source and destination folders, sync direction, and the like.

20 Claims, 4 Drawing Sheets

SYSTEMS AND METHODS FOR SYNCHRONIZING WITH MULTIPLE DATA STORES

BACKGROUND OF THE INVENTION

1. The Field of the Invention

The present invention relates to systems and methods for synchronizing data stores. More particularly, the present invention relates to a framework that provides services for synchronizing a data store with both similar and/or dissimilar data stores.

2. Background and Relevant Art

Today, people are beginning to store data and applications using more than just a computer. Other devices and services have been developed that provide flexibility in a changing world. Many people, for example, often use laptop computers in addition to their regular desktop computer. Other devices such as cellular telephones, personal digital assistants (PDAs), Internet services, and the like are also used for storing data and applications. Each of these devices/computers may be a member or replica in a sync community. In order to use multiple replicas to accomplish a particular goal, however, it is useful to have the same information stored on each replica. Preferably, the information on each replica is current and up-to-date with the information stored on other replicas. A user that stores, for example, contact information on more than one replica would like to avoid entering the same information on each replica.

This problem is overcome through synchronization, which is an automated process that attempts to ensure that each replica has the most current information or data. Synchronization, however, has its own set of problems. First, it is clearly disadvantageous to simply copy and transfer all of the information in one replica to another replica. Synchronizing in this manner consumes a great deal of bandwidth and time. In addition, some of the information on a particular replica may already be up-to-date and is needlessly transferred and written to the other replica.

Another common synchronization method involves keeping track of changes that have occurred subsequent to a previous synchronization. While this may work relatively well for a sync community that only includes two members or replicas, this method becomes cumbersome as more replicas are added to the sync community. The difficulty in synchronizing multiple replicas increases because each replica is required to keep track of what other replicas know. As the various replicas synchronize with one another, the information maintained at a particular member quickly becomes outdated and does not reflect the synchronization that may have occurred between other members of the sync community. This can result in redundant synchronization, false conflicts, and the like.

Synchronization is further complicated when the synchronizing replicas do not store data (items, objects, etc.) in the same manner. Synchronizing a desktop computer, for example, with a hand held device is an example of this particular problem. This problem is further complicated when additional replicas with different data stores also synchronize with the desktop computer. Current synchronization solutions do not provide a strong guarantee that the data will be consistent across all replicas. Ensuring that every data store or replica sees every change on a particular file is insufficient to ensure consistency.

Other problems related to synchronization include, for example, replacing data with outdated data based on the order replicas are synchronized, sync loops in which data in a replica is continually updated and replaced with alternating versions of the data, incurring increased overhead by synchronizing data that may already be in sync, and having data that is in sync being reported as being in conflict.

BRIEF SUMMARY OF THE INVENTION

These and other limitations are overcome by the present invention which relates to systems and methods for synchronizing data stores or replicas in a sync community. More particularly, the present invention relates to a framework that promotes consistent and manageable synchronization across all back end data stores that synchronize with a particular data store.

In one embodiment of the present invention, a sync runtime module provides various services that can be utilized during synchronization. Each back end data store can instantiate and use an adapter to access the services provided by the sync runtime. These services include, but are not limited to, change enumeration, conflict resolution, pluggable conflict resolution, sync metadata management, item ID matching, sync interruptability, prevention of change reflection, and the like or any combination thereof.

A sync controller initializes an adapter that is responsible for performing the synchronization between a data store and a back end data store. The sync controller uses a profile that contains synchronization parameters that initialize and configure the adapter. The profile, for example, indicates source and destination folders for enumerated changes, identifies conflict resolution policies, identifies transformations, provides synchronization filters, and the like or any combination thereof.

Each data store and/or back end store maintains a "knowledge." The knowledge represents changes that the data store (or replica) is aware of and each data store typically maintains its own knowledge. In addition to relieving a particular data store from maintaining data relating to different synchronizations with different data stores, all changes between the particular data store and another data store can be quickly identified by comparing respective their respective knowledge. Knowledge can also be used for conflict detection by determining whether a change made on one of the data stores in included in the knowledge of the other data store. The services and interfaces provided by sync runtime enable adapters to synchronize a data store with a variety of different back end data stores. In addition, conflict detection and resolution can be deterministic.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates one embodiment of a replica's knowledge that reflects what changes a particular replica is aware of.

DETAILED DESCRIPTION OF THE PREFERRED EMBODIMENTS

Synchronization often occurs in a sync community that includes one or more data stores, also referred to herein as replicas or members. The present invention relates to systems and methods for synchronizing data stores that have a similar data structure or format as well as providing an infrastructure that permits other data sources that have proprietary protocols to synchronize. Advantageously, the systems and methods described herein do not require a particular replica to know how many replicas are in a given sync community or know the topology of the sync community. The framework of the present invention includes a sync runtime that provides common services to facilitate the implementation of sync adapters to synchronize a replica or data store with other back end replicas or data stores.

Figure 1:
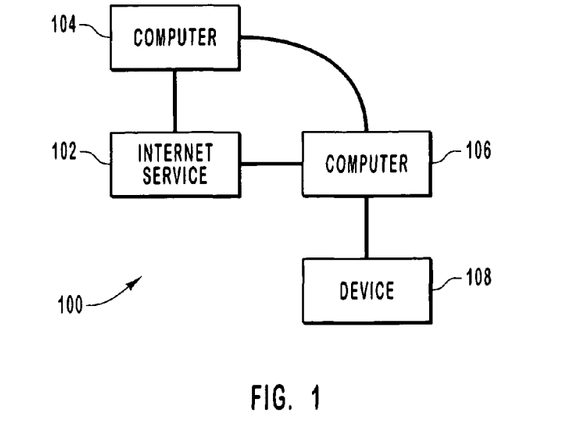
FIG. 1 illustrates an example of a sync community that includes replicas having diverse data stores.

FIG. 1 illustrates an example of a sync community. Through synchronization, each replica of the sync community is able to update at least a part of its own data store to reflect changes that may have been made at other replicas of the sync community. Each replica of the sync community is not required to sync with every other replica in the sync community. In fact, a particular replica may not even be aware of the topology of the sync community or of the number of replicas in the sync community. Replicas can thus be added or removed from the sync community without adversely affecting the ability of a particular replica to synchronize their data store with other replicas.

The example of FIG. 1 illustrates the following members of an exemplary sync community 100: an Internet service 102, a computer 104, a computer 106, and a device 108. In this example, the computer 104 typically synchronizes with either the Internet service 102 or the computer 106. The device 108, however, typically only synchronizes with the computer 106. For example, the community 100 may be used to synchronize electronic messages, contacts, and other personal information of a user. Each member of the sync community 100 has the ability to store this type of information, although each member may have different storage capabilities and different storage formats for the same data. The present invention enables members of the sync community to synchronize regardless of data format, storage capabilities, and the like. In other words, there is no requirement that each member have the same type of data store or that each member store data in a similar or identical format or structure.

Figure 2:
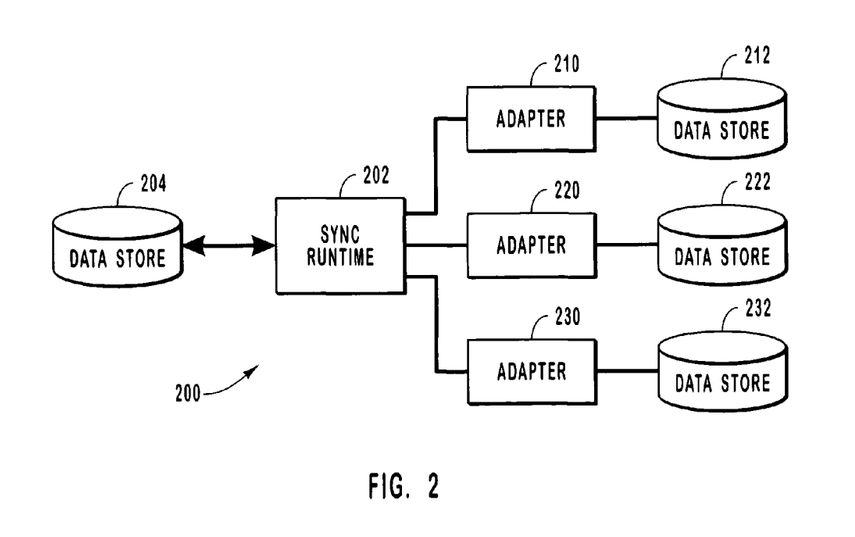
FIG. 2 illustrates one embodiment of a system using services provided by a sync runtime to synchronize a data store with multiple back end data stores.

FIG. 2 illustrates one embodiment of components or modules used to synchronize a data store with other data stores. In this example, there is a primary data store that synchronizes with back end data stores. The present invention, however, can also be applied in a sync community such as the community illustrated in FIG. 1 where a data store or replica may synchronize with more than other data store.

In FIG. 2, the data store 204 is synchronized with multiple back end stores 212, 222, and 232. The sync runtime 202 provides common services that facilitate the implementation of the adapters 210, 220, and 230. Each adapter 210, 220, and 230 is typically configured to synchronize the store 204 with a particular back end store, although other embodiments of the present invention contemplate an adapter that can synchronize the data store 204 with multiple data stores.

The sync runtime 202 provides various services and provides a common configuration model that promotes consistent and manageable synchronization across all back end data stores. The services provided by the sync runtime 202 can be accessed, for example, by the adapters through an application programming interface (API). The adapters 210, 220, 230 perform the synchronization between the various data stores.

Figure 3:
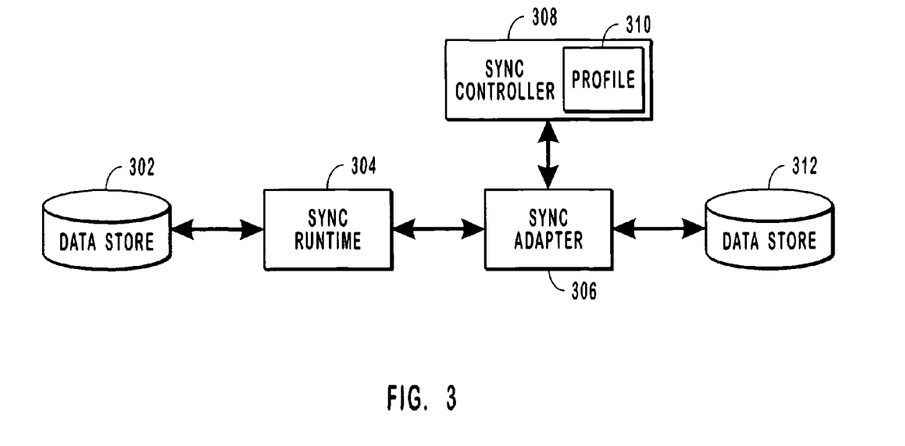
FIG. 3 illustrates one embodiment of a sync controller that uses a profile to configure and initialize a particular sync adapter.

FIG. 3 illustrates a synchronization between a data store 302 and a data store 312. In this example, the sync controller 308 instantiates and initializes a sync adapter 306. The sync adapter 306 then accesses or utilizes the services provided by the sync runtime 304 to synchronize the data store 302 with the data store 312. The synchronization is often assisted by a profile 310, which in one embodiment is configurable data used to perform a particular synchronization with a particular adapter. The profile 310 represents the parameters used by the adapter 306 to synchronize the data store 302 with the data store 312.

A profile 310 may identify a local folder(s) on the data store 302 that serves as the source and destination of changes. The profile 310 may also identify remote folder(s) on the data store 312 that serves and the source and destination of changes as well. The profile 310 may include a local filter that identifies the local information or data to send as well as a remote filter to identify remote information or data to retrieve during synchronization. Conflict resolution policies, synchronization direction (send-only, receive-only, send-receive), transformations used to convert items or data to/from a local format, and security data may also be included in the profile 310. With a profile 310, the need for a local mapping can be eliminated as all necessary sync information can be represented in the profile. Mappings may be necessary, however, for sync requests initiated from the remote or back end data store.

Figure 4:
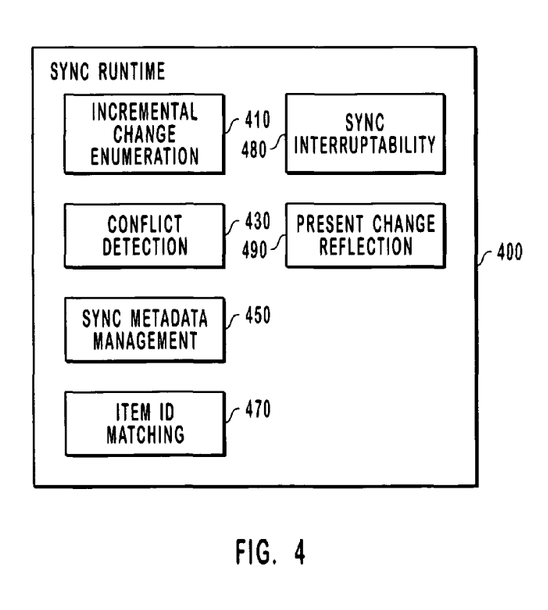
FIG. 4 illustrates exemplary services of a sync runtime that are accessible over an application programming interface.

FIG. 4 illustrates exemplary services provided by one embodiment of a sync runtime 400. One of the services provided by sync runtime 400 is incremental change enumeration 410. Change enumeration is the ability to identify the changes that have occurred since the last synchronization. In one embodiment, changes are enumerated using knowledge (described in more detail below), which is a structure that represents what a particular data store or replica knows at a particular time. Changes can be quickly enumerated by comparing the knowledge of one replica with the knowledge of another replica. One advantage of using knowledge is that the adapters do not need to be aware of the knowledge.

The sync runtime 400 also provides conflict detection 430. The conflict detection 430 may include conflict resolution. Using the concept of knowledge, a conflict typically when occurs when a change made at the data store 302 was made without being aware of a change made at the data store 312. Using the knowledge of a data store, conflicts can be detected.

Conflict resolution can occur using automatic options or logging, for example. Conflict resolution may also occur using, for example, the conflict resolution policy included in the profile.

Sync metadata management 450 is another service provided by sync runtime 400. Most adapters typically need to retain some information about individual items (data or objects, for example) being synchronized or about the synchronization process in general. The sync runtime 400 provides a convenient way for adapters to store this type of data such that it can be used during synchronizations.

Item ID matching 470 is a service that maps items on a remote data store to a local data store and is also related to the transformation of an item such that is can be successfully applied. Sync interruptability 380 enables the synchronization to be interrupted in a manner that permits synchronization to occur at a later time without having to reapply changes that may have already occurred before the synchronization was interrupted. Preventing change reflection 490 is also provided by the sync runtime 400.

Figure 5:
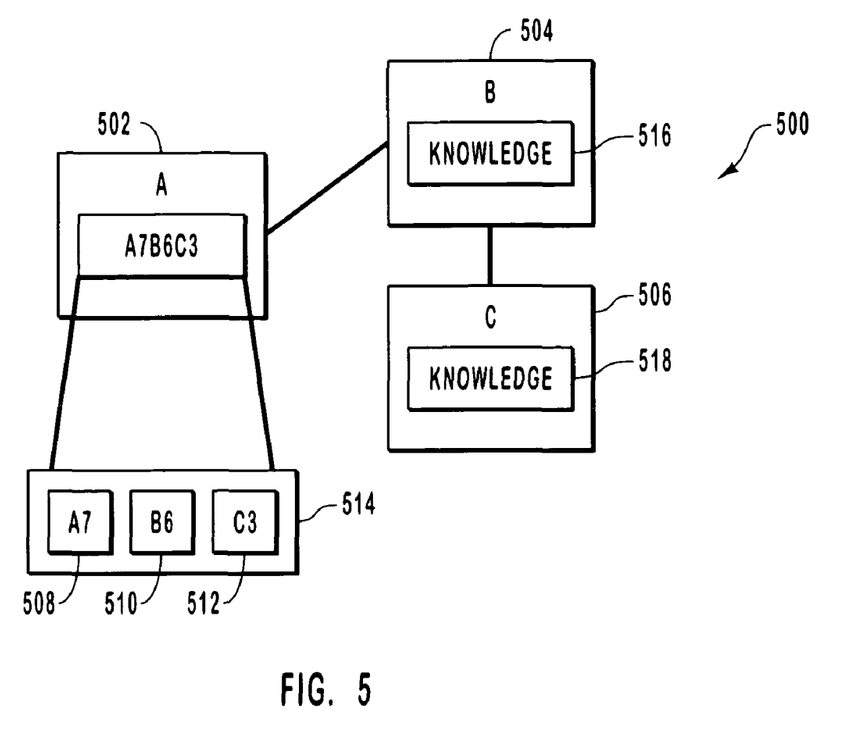

FIG. 5 is used to illustrate the concept of knowledge and how knowledge is used in both change enumeration and conflict detection. FIG. 5 illustrates a sync community 500 that includes three members or replicas that are able to synchronize with each other. In another embodiment, FIG. 5 illustrates a community with a primary replica that synchronizes with multiple back end replicas. FIG. 5 illustrates a replica A 502, a replica B 504, and a replica C 506.

Each replica has a unique ID and when a change is made at a replica, the change is associated with a change ID that includes the unique ID of the replica and a version. The version is an ever-increasing number assigned by the authoring replica. Each replica has a version number. Typically, the change ID of a particular change is assigned by the replica that authored the change.

In one embodiment, change IDs and version numbers are maintained for more than one change unit. A change unit relates, for example, to the granularity with which a synchronization is performed. For example, a change unit may be an entire contact, or a change unit may refer to more specific portions of a particular contact such as the address or phone number. Of course, changes become more difficult to enumerate as the granularity of a change unit becomes more fine.

Knowledge describes a set of changes that a given replica is aware of. For example, the knowledge 514 of the replica A 502 includes change IDs 508, 510, and 512. In this example, the knowledge 514 uses a concise representation of the knowledge that the replica A 502 has. The change ID 508 of A7, for example, represents that the replica A 502 is aware of all changes including A1, A2, . . . and A7. The change ID 510 of B6 represents that the replica A 502 is aware of all changes made by the replica B 504 of B1, . . . B6. The change ID 512 represents similar information. The knowledge 514 is often referred to as a knowledge vector and for each pair (replica ID, version), all of the changes authored by that replica up to and including that version are known.

When a replica desires to synchronize with another replica, it sends out its own knowledge to that replica. With the knowledge, the other replica can compare its knowledge with the received knowledge to enumerate the changes that are not covered by the received knowledge. Changes enumerated in this manner are sent back to the original replica that sent out its own knowledge. Replicas do not need to store information about how much changes or data they have sent to other replicas. A replica only maintains information regarding the changes that it is aware of or knows. This enables the synchronization process to be resilient to sync loops, restorations from backup, and offline propagation changes.

Part of sync data management is to store the knowledge that is used to initiate a synchronization in certain instances. The knowledge can be either remote knowledge or local knowledge and is typically based on where the information about the previous synchronization is stored. Some replicas, for example, are not capable of storing their own knowledge. As a result, the adapter uses the sync data management service to store the knowledge of the remote replica or data store. If sync data management is used to maintain the knowledge of a remote replica, then the changes that are actually applied to the remote replica should be reported to the first replica such that the knowledge can be updated. In contrast, the source replica can maintain or store a knowledge vector when a synchronization occurs. During the next synchronization, the sync runtime can compare the current knowledge vector with the local or stored knowledge vector to identify changes that should be synchronized. Thus, the knowledge used for a particular synchronization can be either local knowledge or supplied knowledge. Sync adapters often maintain state information using the sync management services. The state information maintained may include, for example, information regarding particular items (change IDs) and either a local and/or remote knowledge.

The conflict detection service can include more than one stage. The first stage is to detect a conflict. In one embodiment, a conflict occurs when two replicas make independent changes to the same change unit. Changes are independent if they are made without knowledge of each other. In other words, knowledge of the first is not covered by the knowledge of the second and vice versa.

After a conflict is detected, sync runtime, for example, provides automatic resolution where desired. Sync runtime also permits pluggable conflict resolution modules that can be specified in the profile and used by an adapter to resolve conflicts that are detected. A pluggable conflict resolution module typically contains a policy that defines how detected conflicts should be resolved. Sync runtime can reject the change, log the conflict, and/or resolve the conflict automatically using existing conflict policies or pluggable conflict policies. Exemplary conflict policies include, but are not limited to, (1) disregard incoming changes if in conflict with local data, (2) disregard local data if in conflict with incoming changes, (3) pick the local change or the remote change based on timestamps or other criteria, and (4) choose a change in a deterministic manner such that the choice would be the same on all replicas.

Item ID matching is another service provided by sync runtime and can be illustrated from a send sync perspective and from a receive sync perspective. ID matching is used to associate items on a data store with items on back end data stores. Item ID matching typically maps local item IDs to remote item IDs. During a send sync, the adapter typically maps the local item ID of the item in the data store to the remote item ID of the item that was assigned by the back end store. The remote item ID is sent to the back end data store such that the change can be applied by the back end data store. During a receive sync, the adapter typically provides the remote item ID to the sync runtime that is then matched to the local item ID before a change is made.

The remote item IDs can also include version numbers that may be used during conflict detection and resolution. In addition, conversions or transformations may also be accessed by the adapter such that changes can be applied to items appropriately. When a data store receives changes, the item or change, in addition to the remote item ID being mapped to a local item ID, may be transformed as needed to the appropriate format/structure. When a change is sent from the local data store to a back end data store, the change may also be transformed in accordance with requirements of the remote back end data store.

Sync runtime also allows the synchronization to be interrupted. Synchronization can be interrupted, for example, when one of the replicas crashes or terminates before synchronization is completed, when a user simply cancels the synchronization, and the like. As synchronization occurs, exceptions are made to the knowledge to indicate which changes have been applied to a replica. For example, sync runtime or an adapter may keep a remote knowledge. As changes are sent, each remote ID is added to the current remote knowledge. If a synchronization is interrupted, then the knowledge will include the remote IDs that were successfully applied. As a result, those changes that were added to the knowledge are not included in the changes enumerated in subsequent synchronizations. These entries in the knowledge are referred to as exceptions. When a synchronization is fully completed, the remote knowledge can be updated and the exceptions can be removed.

The present invention extends to both methods and systems for synchronizing and to a framework for synchronizing a data store with like data stores and/or dissimilar data stores. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media and communication media. Computer storage media comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Combinations of the computer storage media and communication media should also be included within the scope of computer-readable media. Computer-executable instructions comprise, for example, instructions and data which cause a general purpose computer, special purpose computer, or special purpose processing device to perform a certain function or group of functions.

Figure 6:
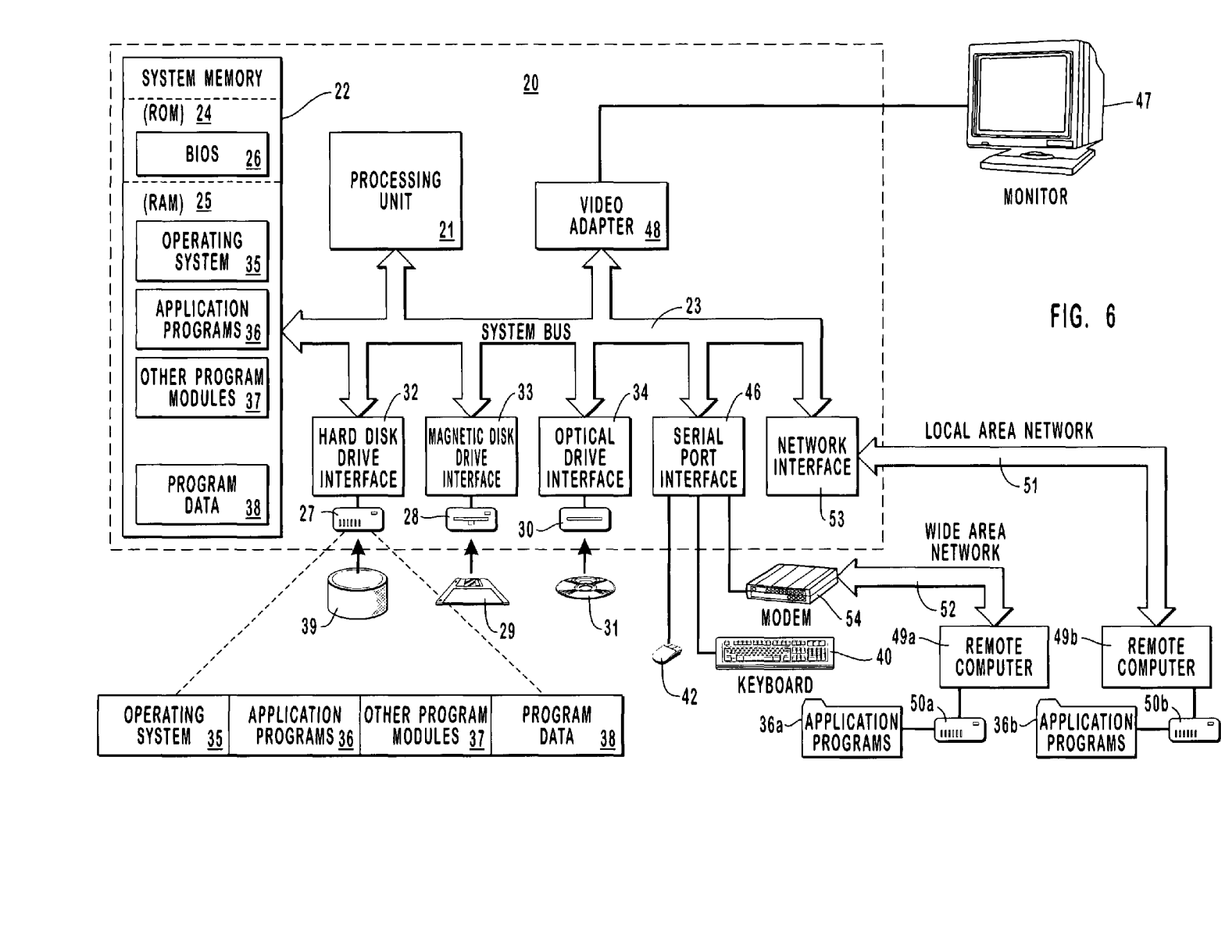
FIG. 6 illustrates one embodiment of a suitable environment for implementing embodiments of the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 6. The logical connections depicted in FIG. 6 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computing sync community, a system for synchronizing multiple replicas in the sync community, the system comprising:
    a first computer having a processor and computer readable media, the computer readable media storing the following:
        a first application program that maintains a first replica in a first data store, the first application program defining a profile for a sync adapter, the sync adapter to be used to synchronize the first replica in the first data store with a second replica in a second data store;
        a sync controller that instantiates the sync adapter based on the profile defined by the first application program, the profile specifying the following:
            a local folder on the first data store that serves as the source and destination of changes to the first or second replica; and
            one or more conflict resolution policies to be applied to resolve conflicts between the first and second replicas;
        a sync runtime module that provides services to the sync adapter, wherein the services provided by the sync runtime module to the sync adapter include a change enumeration service that compares a first knowledge of the first replica with a second knowledge of the second replica to enumerate changes that are described by the second knowledge and absent from the first knowledge;
    the first data store containing the first replica for synchronization with the second replica in the second data store, wherein the first knowledge of the first replica comprises information describing a set of changes to the first replica; and
    the sync adapter that is configured to access the services of the sync runtime module to synchronize the first replica in the first data store with the second replica in the second data store, wherein the sync adapter synchronizes the first replica with the second replica using the change enumeration service of the sync runtime module by comparing the first knowledge with the second knowledge to determine changes that have been made to the second replica of which the first replica is unaware and requesting the changes from the second replica.

2. The system as defined in claim 1, wherein the services provided by the sync runtime module are accessed by the sync adapter using an applications programming interface.

3. The system as defined in claim 1, wherein the services further comprises a conflict detection service that uses the first knowledge of the first replica and the second knowledge of the second replica as well as the conflict resolution policies in the profile to detect and resolve conflicts.

4. The system as defined in claim 3, wherein the conflict detection service detects a conflict when a change enumerated by the first replica is not in the second knowledge of the second replica and a change enumerated by the second replica is not in the first knowledge of the first replica.

5. The system as defined in claim 3, wherein the conflict detection service further comprises a conflict resolution module.

6. The system as defined in claim 5, wherein the conflict resolution module can implement a conflict policy identified in a profile or included in a pluggable conflict resolution module.

7. The system as defined in claim 1, wherein the profile further identifies one or more of:
    a source folder of the second replica;
    a destination folder of the second replica;
    a first filter to filter changes that are enumerated at the first replica;
    a second filter to filter changes retrieved from the second replica; and
    a transformation for converting an item from the second replica to a format of the first replica.

8. The system as defined in claim 1, wherein the services further comprises one or more of:
    an item ID matching service, wherein second item IDs of the second replica are provided by the particular adapter during a receive sync and first item IDs of the first replica are provided by the sync runtime module during a send sync;
    a sync interruptability service that includes exceptions in a remote knowledge; and
    a service that prevents changes from reflecting to and from the first replica.

9. The system as defined in claim 1, wherein the services further comprises a sync metadata management service that stores a remote knowledge for the particular adapter.

10. The system as defined in claim 9, wherein the sync metadata management service stores a local knowledge used by the particular adapter.

11. A non-transitory computer-readable storage medium storing the following components for implementing a sync community:
- a first application program that maintains a first replica in a first data store, the first application program defining a profile for a sync adapter, the sync adapter to be used to synchronize the first replica in the first data store with a second replica in a second data store;
- a sync controller that instantiates the sync adapter based on the profile defined by the first application program, the profile specifying the following:
    - a local folder on the first data store that serves as the source and destination of changes to the first or second replica; and
    - one or more conflict resolution policies to be applied to resolve conflicts between the first and second replicas;
- a sync runtime module that provides services to the sync adapter, wherein the services provided by the sync runtime module to the sync adapter include a change enumeration service that compares a first knowledge of the first replica with a second knowledge of the second replica to enumerate changes that are described by the second knowledge and absent from the first knowledge, the first knowledge comprising information describing a set of changes to the first replica; and
- the sync adapter that is configured to access the services of the sync runtime module to synchronize the first replica in the first data store with the second replica in the second data store, wherein the sync adapter synchronizes the first replica with the second replica using the change enumeration service of the sync runtime module by comparing the first knowledge with the second knowledge to determine changes that have been made to the second replica of which the first replica is unaware and requesting the changes from the second replica.

12. The medium as defined in claim 11, wherein the services provided by the sync runtime module are accessed by the sync adapter using an applications programming interface.

13. The medium as defined in claim 11, wherein the services further comprise a conflict detection service that uses the first knowledge of the first replica and the second knowledge of the second replica as well as the conflict resolution policies in the profile to detect and resolve conflicts.

14. The medium as defined in claim 13, wherein the conflict detection service detects a conflict when a change enumerated by the first replica is not in the second knowledge of the second replica and a change enumerated by the second replica is not in the first knowledge of the first replica.

15. The medium as defined in claim 13, wherein the conflict detection service further comprises a conflict resolution module.

16. The medium as defined in claim 15, wherein the conflict resolution module implements a conflict policy identified in a profile or included in a pluggable conflict resolution module.

17. The medium as defined in claim 11, wherein the profile further identifies one or more of:
- a source folder of the second replica; a destination folder of the second replica; a first filter to filter changes that are enumerated at the first replica; a second filter to filter changes retrieved from the second replica; and a transformation for converting an item from the second replica to a format of the first replica.

18. The medium as defined in claim 11, wherein the services further comprises one or more of:
- an item ID matching service, wherein second item IDs of the second replica are provided by the particular adapter during a receive sync and first item IDs of the first replica are provided by the sync runtime module during a send sync;
- a sync interruptability service that includes exceptions in a remote knowledge; and
- a service that prevents changes from reflecting to and from the first replica.

19. The medium as defined in claim 11, wherein the services further comprises a sync metadata management service that stores a remote knowledge for the particular adapter.

20. The medium as defined in claim 19, wherein the sync metadata management service stores a local knowledge used by the particular adapter.

\* \* \* \* \*